United States Patent
Nien

(10) Patent No.: US 7,024,977 B2
(45) Date of Patent: Apr. 11, 2006

(54) WINDOW BLIND CUTTING MACHINE

(75) Inventor: Ming Nien, Changhua Hsien (TW)

(73) Assignee: Nien Made Enterprise Co., Ltd., Taichung (TW)

(*) Notice: Subject to any disclaimer, the term of this patent is extended or adjusted under 35 U.S.C. 154(b) by 32 days.

(21) Appl. No.: 10/725,256

(22) Filed: Dec. 2, 2003

(65) Prior Publication Data

US 2005/0045012 A1    Mar. 3, 2005

(30) Foreign Application Priority Data

Sep. 3, 2003   (TW) .............................. 92215973 U

(51) Int. Cl.
*B62D 7/01* (2006.01)

(52) U.S. Cl. .................................................. 83/522.19

(58) Field of Classification Search .................. 83/100, 83/522.19, 196, 197, 198
See application file for complete search history.

(56) References Cited

U.S. PATENT DOCUMENTS

| | | | |
|---|---|---|---|
| 5,634,387 A * | 6/1997 | Squires | 83/468 |
| 6,615,698 B1 * | 9/2003 | Chuang et al. | 83/24 |
| 2002/0178884 A1 | 12/2002 | Chuang | |

* cited by examiner

*Primary Examiner*—Charles Goodman
(74) *Attorney, Agent, or Firm*—Browdy and Neimark, PLLC

(57) ABSTRACT

A window blind cutting machine includes a machine base; two cutting units respectively disposed at two ends of the machine base, each cutting unit having a cutter movable along a respective cutting path across a longitudinal axis of the machine base for cutting off a part of the window blind carried on the machine base that protrudes over a respective reference line based on the cutting path, two measuring devices respectively disposed at an outer side of each cutting unit for measuring the part of the window blind that protrudes over the reference line, and two inner measuring rules arranged in parallel to the longitudinal axis and respectively extended in reversed directions from one cutting unit toward the other and having a respective true-zero disposed at the reference line, for measuring the length of the window blind from the reference line.

14 Claims, 4 Drawing Sheets

WINDOW BLIND CUTTING MACHINE

BACKGROUND OF THE INVENTION

1. Field of the Invention

The present invention relates generally to window blinds and, more specifically, to a window blind cutting machine for cutting window blinds to the desired length.

2. Description of the Related Art

Window blind manufacturers provide only a limited number of sizes (the length of the headrail, bottom rail, and slats) for each model, and the retailers or upholsterers cut the window blinds to the desired sizes by means of a window blind cutting machine when selling or installing the window blinds.

The members of a window blind have two end structures made symmetrical for the insertion of cord members. When cutting the members of a window blind, the two ends of the members must be equally cut, keeping the ends symmetrical.

U.S. patent publication No. 2002/178884 discloses an advanced window blind cutting machine, which comprises two cutters transversely movably mounted at two ends of the machine base. The members of the window blind are put on the machine base and extended along the length of the machine base. The two ends of the machine base are respectively equipped with a respective outwardly extended measuring rule for measuring the size of the part to be cut. During cutting, the members of the window blind can be moved longitudinally from one end of the machine base to the other, for enabling the both ends of the members of the window blind to be cut by the cutters.

According to the aforesaid cutting method, the operator calculates the length to be cut off subject to the actual length of the window blind and the desired window blind size. For example, when wishing to cut a window blind of 31.5 inches to 28 inches, the operator calculates the length difference between the original length of the window blind and the desired window blind size to obtain the size to be cut at each other, i.e., (31.5−28)/2=1.75 inches. A minor calculation error may cause the window blind to be improperly cut. In this case, a secondary processing process is necessary. If the both ends of the members of the window blind are cut over the accurate size, the window blind becomes not in conformity with the desired specifications and not usable.

SUMMARY OF THE INVENTION

It is the primary objective of the present invention to provide a window blind cutting machine, which enables the operator to accurately control the cutting, keeping the members of the window blind at the desired size.

To achieve this objective of the present invention, the window blind cutting machine comprises a machine base for holding moveably a window blind to be cut along a direction parallel to a longitudinal axis of the machine base; two cutting units respectively disposed at two distal ends of the machine base, the cutting units each having a cutter movable along a respective cutting path across the longitudinal axis of the machine base for cutting off a part of the window blind held on the machine base that protrudes over a respective reference line based on the cutting path; and at least one measuring device respectively disposed at an outer side of one the cutting unit, the at least one measuring device each having an outer measuring rule disposed in parallel to the longitudinal axis of the machine base for measuring the part of the window blind that protrudes over the reference line. The machine base is provided with at least one inner measuring rule arranged in parallel to the longitudinal axis of the machine base. The at least one inner measuring rule respectively extends in direction from one of the cutting units toward the other cutting unit and has a respective true-zero disposed at the reference line of the cutting path of the corresponding cutting unit, for enabling the operator to measure the length of the window blind from the reference line.

When cutting the members of a window blind, one end of the window blind is set in the first cutting unit, and then the protruded part of the window blind is measured by the measuring device at the outer side of the first cutting unit and cut off by the first cutting unit, and then the window blind is moved to the second cutting unit and measured by the inner measuring rule and then cut off subject by the second cutting unit subject to the desired length.

DETAILED DESCRIPTION OF THE INVENTION

Figure 1:
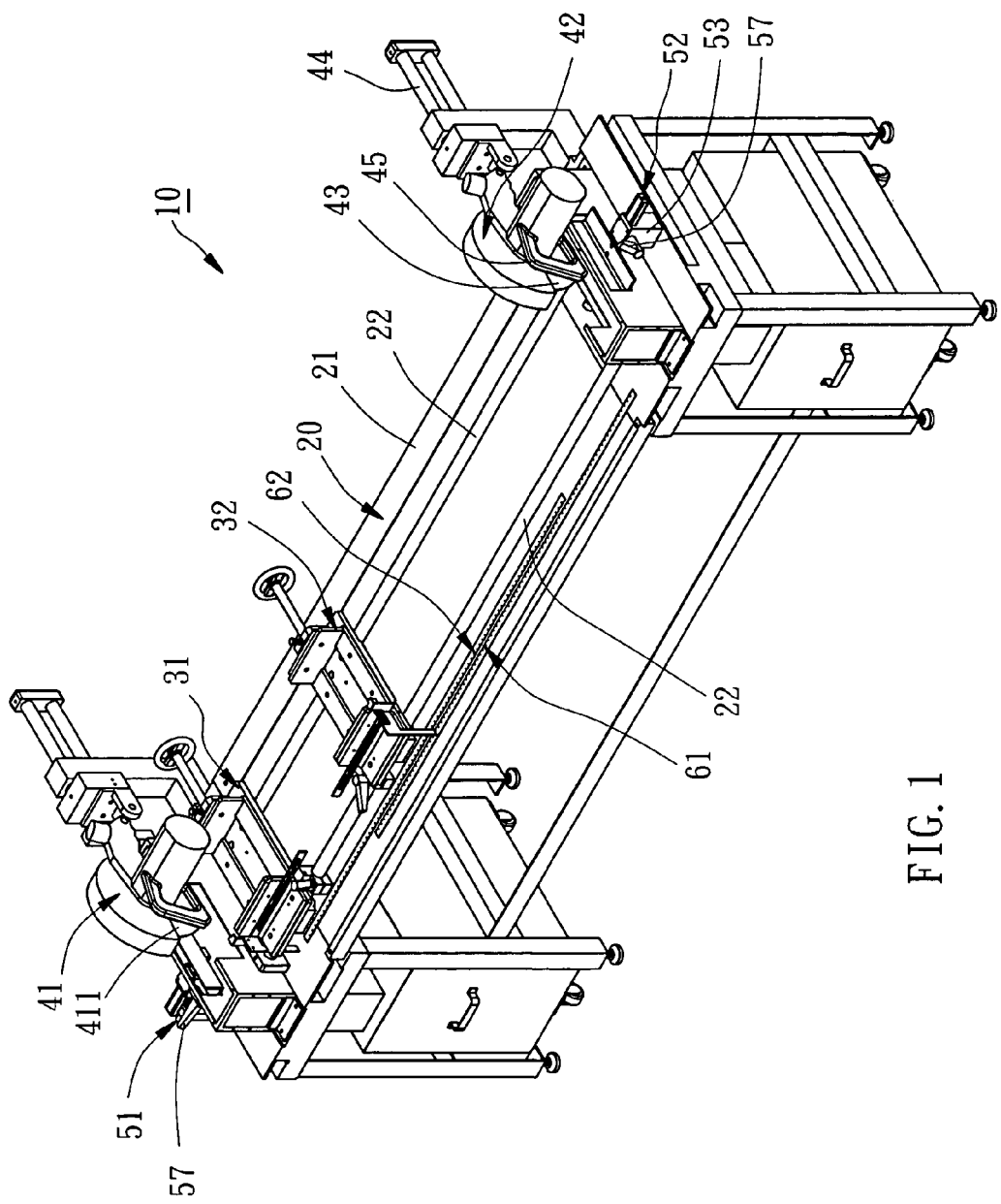
FIG. 1 is a perspective view of a window blind cutting machine according to the present invention.

Referring to FIG. 1, a window blind cutting machine 10 is shown comprising an elongated machine base 20, a first cutting unit 41 and a second cutting unit 42 disposed at the two distal ends of the machine base 20 at the top, a first carriage 31 and a second carriage 32 axially movably mounted on the machine base 20 at the top between the first cutting unit 41 and the second cutting unit 42, a first measuring device 51 and a second measuring device 52 respectively disposed at the two distal ends of the machine base 20 adjacent to the cutting units 41 and 42 at an outer side, and a first inner measuring rule 61 and a second inner measuring rule 62 longitudinally arranged on the machine base 20 at the top in axial direction.

The machine base 20 has an elongated worktable 21, and two rails 22 longitudinally arranged in parallel on the worktable 21.

Figure 2:
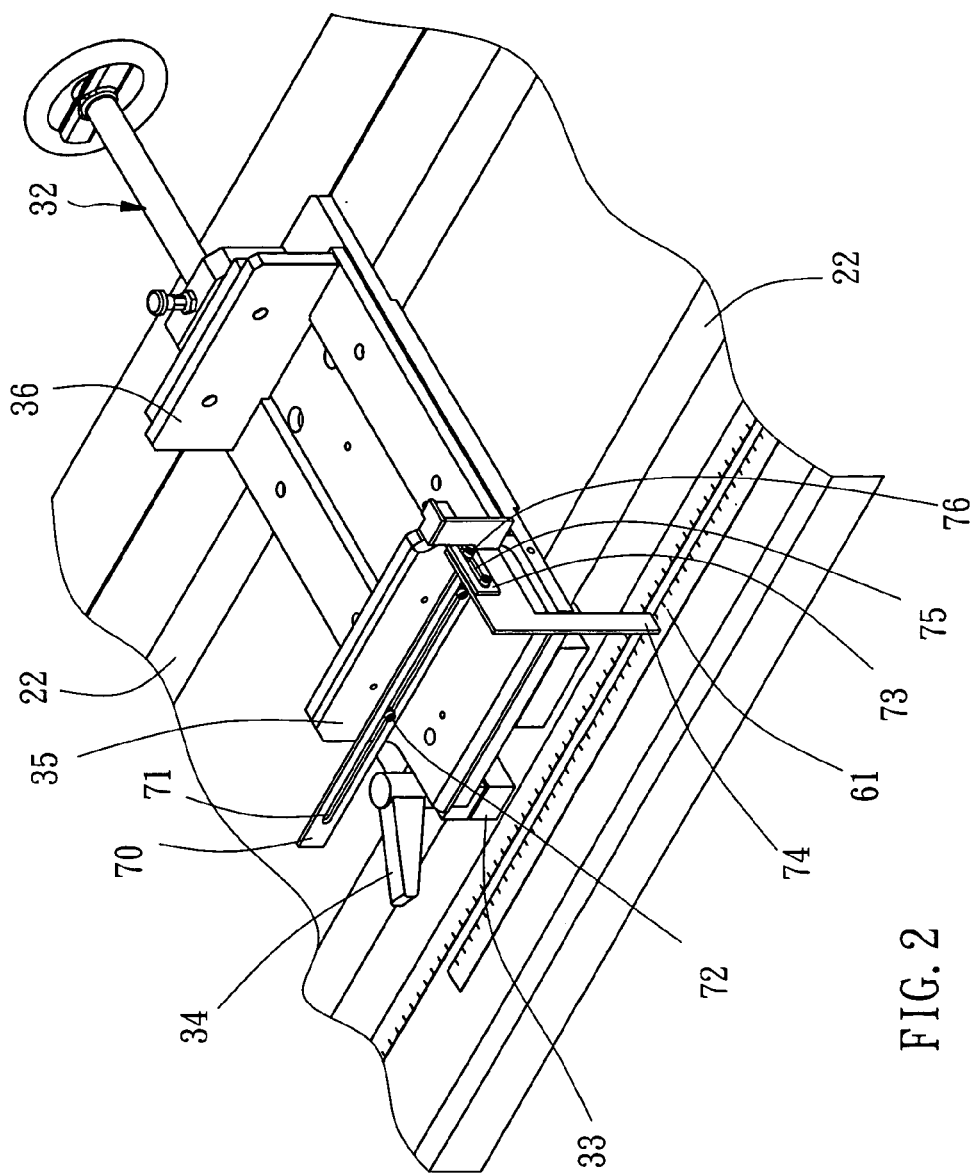
FIG. 2 is an enlarged view of a part of FIG. 1, showing the positioning of the second carriage on the worktable of the machine base and the received status of the alignment plate.
Figure 3:
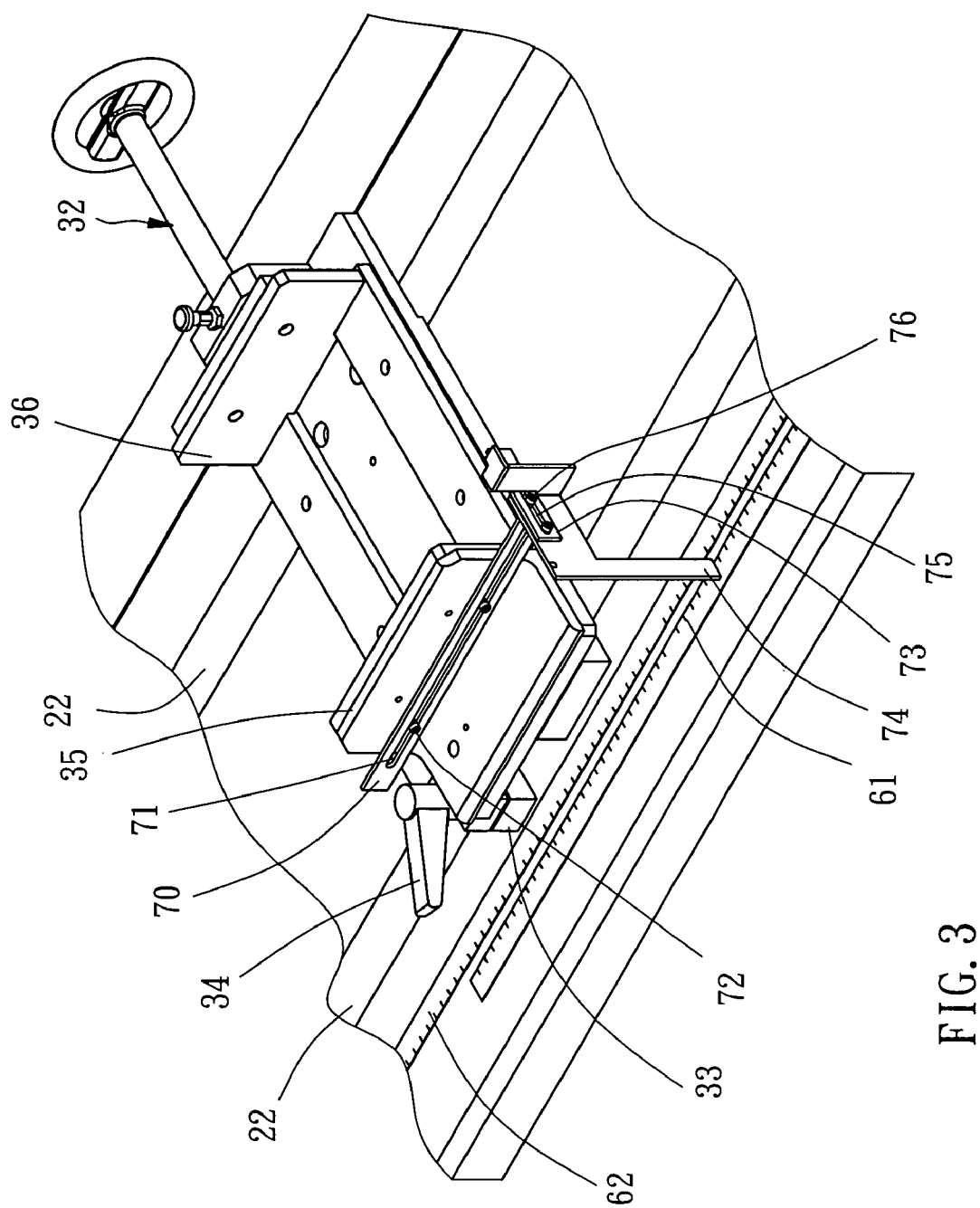
FIG. 3 is similar to FIG. 2 but showing the alignment plate extended out.

Referring to FIGS. 2 and 3 and FIG. 1 again, the first carriage 31 and the second carriage 32 are respectively coupled to the rails 22 and movable along the rails 22, each comprising a C-shaped clamping member 33 coupled to one rail 22 and a lock 34 mounted in the C-shaped clamping member 33. According to this embodiment, the lock 34 is a lock screw. The user can rotate the lock screw 34 of each carriage 31 or 32 in one direction to lock the C-shaped clamping member 33 of the respective carriage 31 or 32 to the rails 22, or in the other direction to unlock the C-shaped clamping member 33 of the respective carriage 31 or 32 from the rails 22. Each carriage 31 or 32 further comprises a fixed clamping plate 35 and a movable clamping plate 36 vertically disposed at the top side. The fixed clamping plate 35 and the movable clamping plate 36 are arranged in parallel, and extended in parallel to the longitudinal axis (major axis) of the worktable 21. The fixed clamping plate 35 is affixed to the carriage 31 or 32. The movable clamping plate 36 can be moved relative to the fixed clamping plate 35 subject to the operator's control, to adjust the pitch between the fixed clamping plate 35 and the movable clamping plate 36. The members of the window blind to be cut are carried on the carriages 31 and 32. After loading of the window blind members to be cut, the movable clamping plates 36 of the carriages 31 and 32 are respectively adjusted to hold down the loaded window blind members against the respective fixed clamping plates 35, and then the carriages 31 and 32 are moved along the rails 22 to feed the loaded window blind members for cutting by the first cutting unit 41 or the second cutting unit 42.

The cutting units 41 and 42 are disposed at the two distal ends of the worktable 21. The first carriage 31 is disposed relatively closer to the first cutting unit 41 than the second carriage 32, and the second carriage 32 is disposed relatively closer to the second cutting unit 41 than the first carriage 31. Each cutting unit 41 or 42 comprises a cutter 43, a sliding mechanism 44, and a handle 45. By means of the effect of the sliding mechanism 44, the user can control the handle 45 to move the cutter 43 forwardly downwards along a circular path across the longitudinal axis of the worktable 21 to cut off the excessive part of the loaded window blind members along the reference line, namely, the path (the cutting units are of the known design not within the scope of the claims of the present invention; with reference to the detailed description of the cutting units, please refer to cited reference US2002/0178884; alternatively, each cutter unit can be set to let the cutter 43 be moved back and forth vertically to directly cut off the window blind members).

Figure 4:
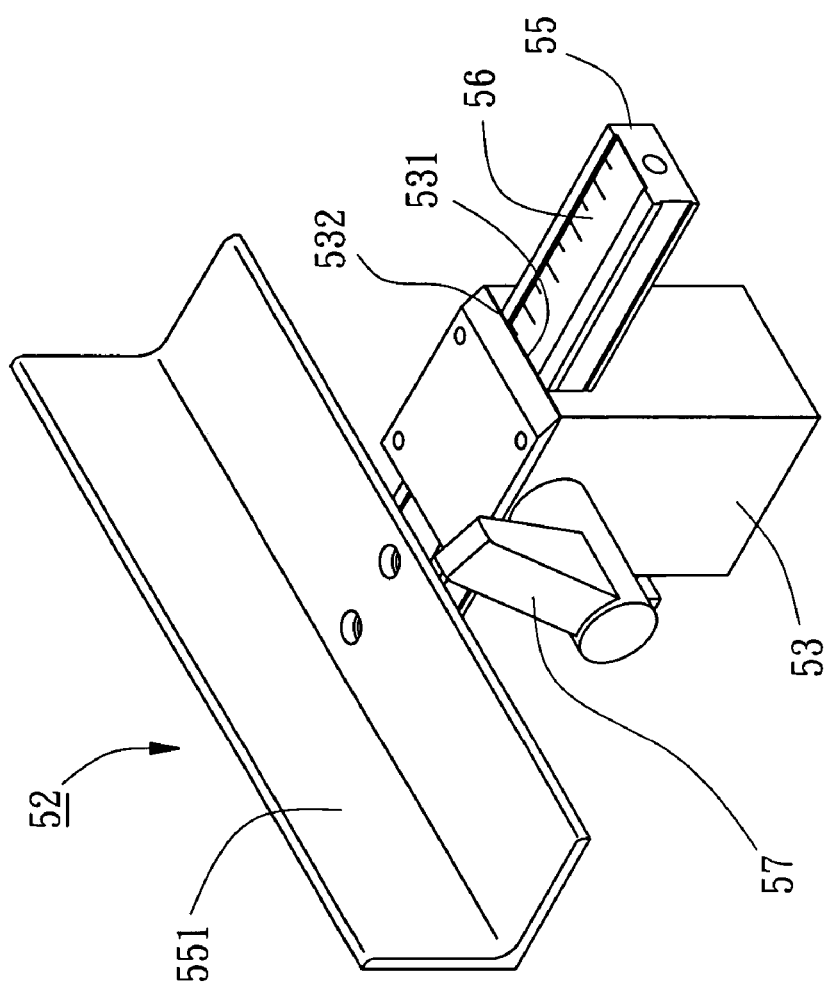
FIG. 4 is an enlarged view of a part of the present invention, showing the structure of the first measuring device.

The first measuring device 51 is disposed at an outer side relative to the first cutting unit 41. The second measuring device 52 is disposed at an outer side relative to the second cutting unit 42. As illustrated in FIG. 4, each measuring device 51 or 52 comprises a base 53 mounted on the machine base 20, the base 53 having a horizontal slot 531 extended in parallel to the longitudinal axis of the worktable 21 and a reading line 532 at the top side of the horizontal slot 531, a sliding bar 55 inserted through the horizontal slot 531 and movable along the horizontal slot 531, a stop plate 551 affixed to one end of the sliding bar 55, and an outer measuring rule 56 longitudinally formed integral with the top wall of the sliding bar 55. The marks on the outer measuring rule 56 are to show the distance from the true-zero at the aforesaid reference line to the stop plate 551, i.e. the "zero" mark of the outer measuring rule 56 is aimed at the reading line 532 when the stop plate 551 disposed at the outer side of the cutting path.

Further, a lock 57 is provided to lock the sliding bar 55 and to set the window blind cutting position. Through the outer measuring rule 56, the operator knows the length of the protruded part of the window blind members over the reference line.

Referring to FIG. 1 again, the first inner measuring rule 61 extends axially from the cutting path of the cutter 43 of the first cutting unit 41 toward the second cutting unit 42 with the "true-zero" disposed at the cutting path of the cutter 43 of the first cutting unit 41. The second inner measuring rule 62 extends from the cutting path of the cutter 43 of the second cutting unit 42 toward the first cutting unit 41 with the "true-zero" disposed at the cutting path of the cutter 43 of the second cutting unit 42.

Further, the first carriage 31 is provided with a sliding bar 70. The sliding bar 70 has a longitudinal sliding slot 71 disposed in parallel to the longitudinal axis of the worktable 21. Two screw bolts 72 are inserted through the sliding slot 71 and threaded into the first carriage 31 to adjustably lock the sliding bar 70 to the first carriage 31. When loosened the screw bolts 72, the sliding bar 70 can be moved horizontally axially forwards or backwards to the desired position and then locked again.

The sliding bar 70 is provided with an alignment plate 73 and an index 74, which extends vertically downwardly from the alignment plate 73. The alignment plate 73 has a transverse sliding slot 75 horizontally extending in transverse direction perpendicular to the sliding slot 71 of the sliding bar 70. Two screw bolts 76 are inserted through the sliding slot 75 and threaded into the sliding bar 70 to adjustably lock the alignment plate 73 to the sliding bar 70. When loosened the screw bolts 75, the alignment plate 73 can be moved back and forth in transverse direction along the minor axis of the elongated machine base 20 to the desired position and then locked again (see FIG. 3) to align one end of the window blind members. The index 74 and the alignment plate 73 have same coordinates value on the longitudinal axis of the worktable 21. The index 74 is disposed in close proximity to the first inner measuring rule 61, for enabling the operator to read the reading (mark) on the first inner measuring rule 61 indicated by the index 74. The second carriage 32 has the same structure. The sliding bar 70 at the second carriage 32 is disposed on the outer side of the second carriage close proximity to the second cutting unit 42.

During operation, for example, when operating the first cutting unit 41, control the clamping plates 35 and 36 of the carriages 31 and 32 to hold down the window blind members, and then use the outer measuring rule 56 of the first measuring device 51 to adjust the stop plate 551 to the position where the distance between the stop plate 551 and the cutting path of the cutter 43 of the first cutting unit 41 is equal to one half of the length to be cut off for the wind blind members, and then use the lock 57 to lock the stop plate 551, and then move the carriages 31 and 32 in direction toward the cutter 43 to stop the window blind members at the stop plate 551, and then use the respective locks 34 to lock the carriages 31 and 32 to the rails 22, and then operate the cutting unit 41 to cut off the corresponding end of the window blind members. After cutting, loosen the movable clamping plates 36 of the carriages 31 and 32, and then move the window blind members, and then set the alignment plate 73 of the first carriage 31 in a predetermined position, and then stop the cut end of the window blind members at the alignment plate 73, and then hold down the window blind members with the movable clamping plates 36 of the carriages 31 and 32, and then unlock the locks 34 of the carriages 31 and 32, and then move the carriages 31 and 32 to carry the window blind members toward the second cutting unit 52, and then use the index 74 and the second inner measuring rule 62 to read the length of the window blind members from the cutting path of the cutter 43 of the second cutting unit 42, and then operate the cutter 53 of the second cutting unit 52 to cut the corresponding end of the window blind members when the reading at the second inner measuring rule 62 indicated by the index 74 is equal to the desired window blind member size.

In short, the window blind cutting machine can be operated to cut the end of the window blind members that is close to the first cutting unit 41 at first, and then to cut the other end of the window blind members that is close to the second cutting unit 42. The measuring of the window blind members at the first cutting unit 41 is made by means of the first measuring device 51, and the measuring of the window blind members at the second cutting unit 42 is made by means of the second inner measuring rule 62, i.e., cut one end of the window blind at the size equal to one half of the difference between the actual size of the window blind to be cut and the desired window blind size at first, and then cut the other end of the window blind. For example, if the size of the window blind before cutting is 31.5 inches, and the desired window blind size is 28 inches, thus, cut off 1.75 inches [(31.5−28)/2] from one end of the window blind. If the first end of the window blind is not accurately cut due to a calculation mistake, at this time, the user can directly read the reading of 28 inches at the first (or second) inner measuring rule, and then cut the second end of the window blind. Thus, the size of the window blind after cut is the desired window blind size. Because the precision requirement of window blinds is not very critical, the minor error of the asymmetric status between the two ends of the window blind due to an improper cutting at the first end is allowable. In short, the final cut size is accurately the desired window blind size.

Alternatively, the window blind cutting machine can be operated to cut the end of the window blind that is close to the second cutting unit 42, and then to cut the other end of the window blind that is close to the first cutting unit 41. The measuring of the window blind members at the second cutting unit 42 is made by means of the second measuring device 52, and the measuring of the window blind members at the first cutting unit 41 is made by means of the first inner measuring rule 61. In short, the operator can use either of the two cutting units 51 and 52 to cut the window blind members at first.

As indicated above, the invention can accurately obtain the desired window blind size, eliminating the problem of an excessively long or short final cut size, or the necessity of a secondary processing. Therefore, the invention saves much labor, eliminates material loss, and prevents the production of useless products.

Alternatively, the window blind cutting machine can be made having only two cutting units, one measuring device, and one inner measuring rule. According to this design, the measuring device is disposed adjacent to one cutting unit, namely, the first cutting unit at an outer side, having an outer measuring rule with its "true-zero" disposed at the reference line of the first cutting unit; the inner measuring rule extends in direction from the second cutting unit toward the first cutting unit with its "true-zero" disposed at the reference line of the second cutting unit. The window blind cutting machine can also be made having only one cutting unit, one measuring device, and one inner measuring rule. According to this design, the measuring device is disposed adjacent to the cutting unit at an outer side, having an outer measuring rule with its "true-zero" disposed at the reference line of the cutting unit; the inner measuring rule has its "true-zero" disposed at the reference line of the cutting unit. When in use, the cutting unit is operated to cut one end of the window blind, and then the window blind is reversed manually to let the second end be cut by the cutting unit.

What is claimed is:

1. A window blind cutting machine comprising:
   a machine base for holding moveably a window blind to be cut along a direction parallel to a longitudinal axis of said machine base;
   a first cutting unit and a second cutting unit respectively disposed at two distal ends of said machine base, each said cutting unit having a cutter movable along a respective cutting path across the longitudinal axis of said machine base for cutting off a part of the window blind held on said machine base that protrudes over a respective reference line based on said cutting path;
   a first measuring device disposed at an outer side of said first cutting unit, said first measuring device having a first outer measuring rule disposed in parallel to the longitudinal axis of said machine base for measuring the part of the window blind that protrudes over said reference line;
   wherein said machine base is provided with a first inner measuring rule arranged in parallel to the longitudinal axis of said machine base at an inner side of said first cutting unit between the first cutting unit and the second cutting unit, said first inner measuring rule respectively extending in direction from said first cutting unit toward the second cutting unit and has a true-zero disposed at the reference line of the cutting path of the second cutting unit, for enabling the operator to measure the length of the window blind from the reference line of the second cutting unit.

2. The window blind cutting machine as claimed in claim 1, wherein a second measuring device having a second outer measuring rile is disposed adjacent to the outer side of said second cutting unit.

3. The window blind cutting machine as claimed in claim 1, wherein a second inner measuring rule extends from the reference line based on the cutting path of said second cutting unit toward the first cutting unit and has a true-zero disposed at the reference line of the first cutting unit.

4. The window blind cutting machine as claimed in claim 1, wherein said machine base is provided with a first carriage, said first carriage being longitudinally movably mounted on said machine base and lockable to said machine base at a desired position for holding the window blind to be cut and moving the loaded window blind on said machine base in the direction along the longitudinal axis of said machine base.

5. The window blind cutting machine as claimed in claim 4, wherein a second carriage is arranged in line along the longitudinal axis of said machine base.

6. The window blind cutting machine as claimed in claim 5, wherein each said first and second carriage comprises an alignment plate for aligning one end of the window blind to be cut, and an index, said index and said alignment having same coordinates value on the longitudinal axis of said machine base, said index being disposed in close proximity to a corresponding said inner measuring rule for enabling the operator to read readings on the corresponding inner measuring rule indicated by said index.

7. The window blind cutting machine as claimed in claim 6, wherein each said first and second carriage comprises a sliding bar movable relative to the corresponding carriage along the longitudinal axis of said machine base and lockable to the corresponding carriage in a desired position; the alignment plate and index of each said first and second carriage being disposed at the sliding bar of the corresponding carriage.

8. The window blind cutting machine as claimed in claim 7, wherein said sliding bar comprises a longitudinal sliding slot disposed in parallel to the longitudinal axis of said machine base, and two screw bolts respectively inserted through said longitudinal sliding slot and threaded into the corresponding carriage to lock said sliding bar to the corresponding carriage.

9. The window blind cutting machine as claimed in claim 7, wherein said alignment plate is movable in a transverse direction perpendicular to the longitudinal axis of said machine base and lockable to the corresponding sliding bar.

10. The window blind cutting machine as claimed in claim 9, wherein said alignment plate comprises a transverse sliding slot horizontally extending in the transverse direction perpendicular to the sliding slot of the corresponding sliding bar, and two screw bolts inserted through said transverse sliding slot and threaded into the corresponding sliding bar to adjustably lock said alignment plate to the corresponding sliding bar.

11. The window blind cutting machine as claimed in claim 4, wherein said machine base comprises two rails longitudinally arranged in parallel; said first and second carriage each comprising a C-shaped clamping member longitudinally slidably coupled to one of said rails, and a lock mounted in said C-shaped clamping member for locking said C-shaped clamping member to the corresponding rail.

12. The window blind cutting machine as claimed in claim 4, wherein each said first and second carriage comprises a fixed clamping plate and a movable clamping plate disposed at a top side thereof and arranged in parallel to the longitudinal axis of said machine base, said fixed clamping plate being affixed to the corresponding carriage, said movable clamping plate being movable relative to said fixed clamping plate to adjust the pitch between said fixed clamping plate and said movable clamping plate for holding the window blind therebetween.

13. The window blind cutting machine as claimed in claim 1, wherein each said first and second measuring device comprises a base mounted on said machine base, a sliding bar slidably mounted to said base of said corresponding measuring device along the direction parallel to the longitudinal axis of said machine base, a stop plate affixed to one end of the sliding bar of the corresponding measuring device, and said outer measuring rule longitudinally formed integral with a top wall of the sliding bar of the respective measuring device.

14. A window blind cutting machine comprising:
  a machine base for holding moveably a window blind to be cut along a direction parallel to a longitudinal axis of said machine base;
  a cutting unit disposed at one end of said machine base, said cutting unit having a cutter movable along a cutting path across the longitudinal axis of said machine for cutting off a part of the window blind held on said machine base that protrudes over a reference line based on said cutting path;
  a measuring device disposed at an outer side of said cutting unit, said measuring device having an outer measuring rule disposed in parallel to the longitudinal axis of said machine base for measuring the part of the window blind that protrudes over said reference line;
  wherein said machine base is provided with an inner measuring rule disposed in parallel to the longitudinal axis of said machine base at an inner side of said cutting unit, said inner measuring rule extending from said cutting unit toward an opposite end of said machine base and having a true-zero disposed at the reference line of the cutting path of the cutting unit, for enabling the operator to measure the length of the window blind from the reference line.

* * * * *